United States Patent Office 3,445,060
Patented May 20, 1969

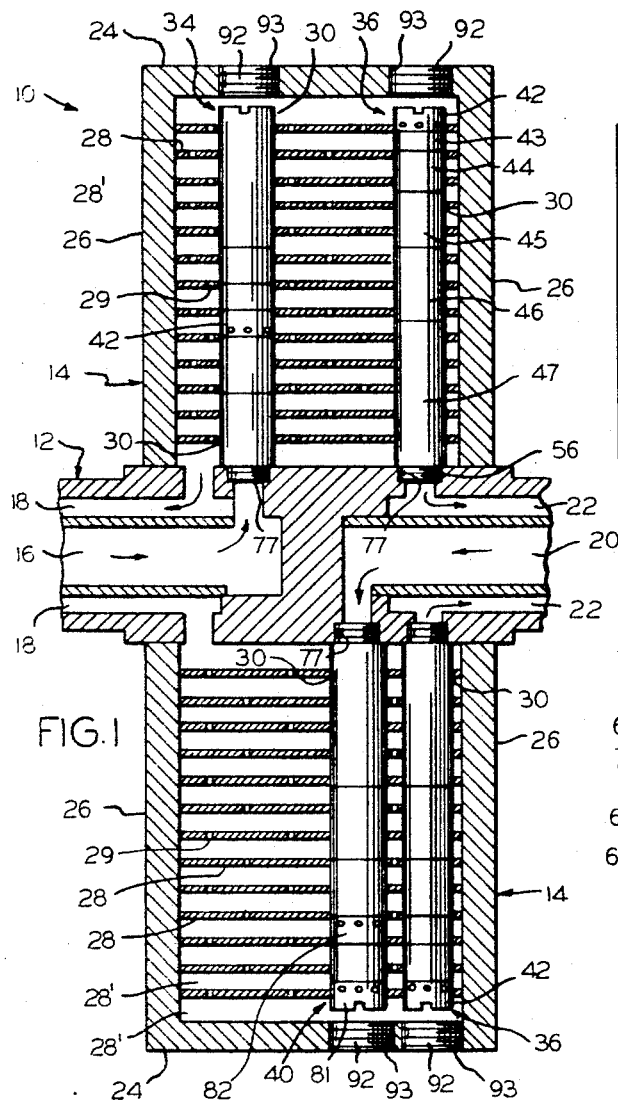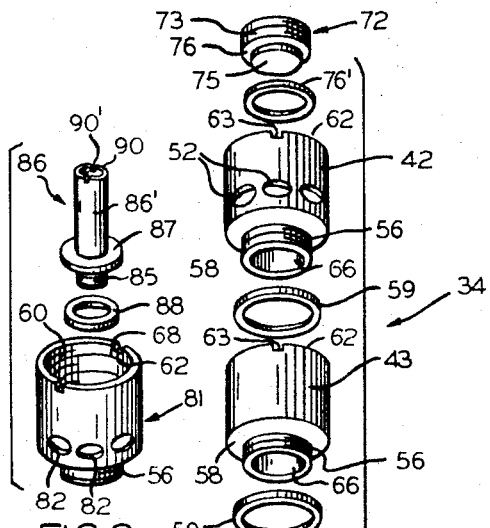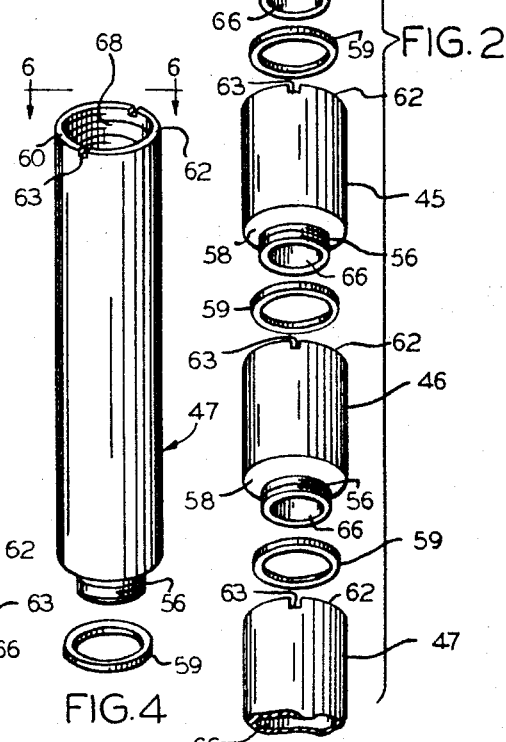

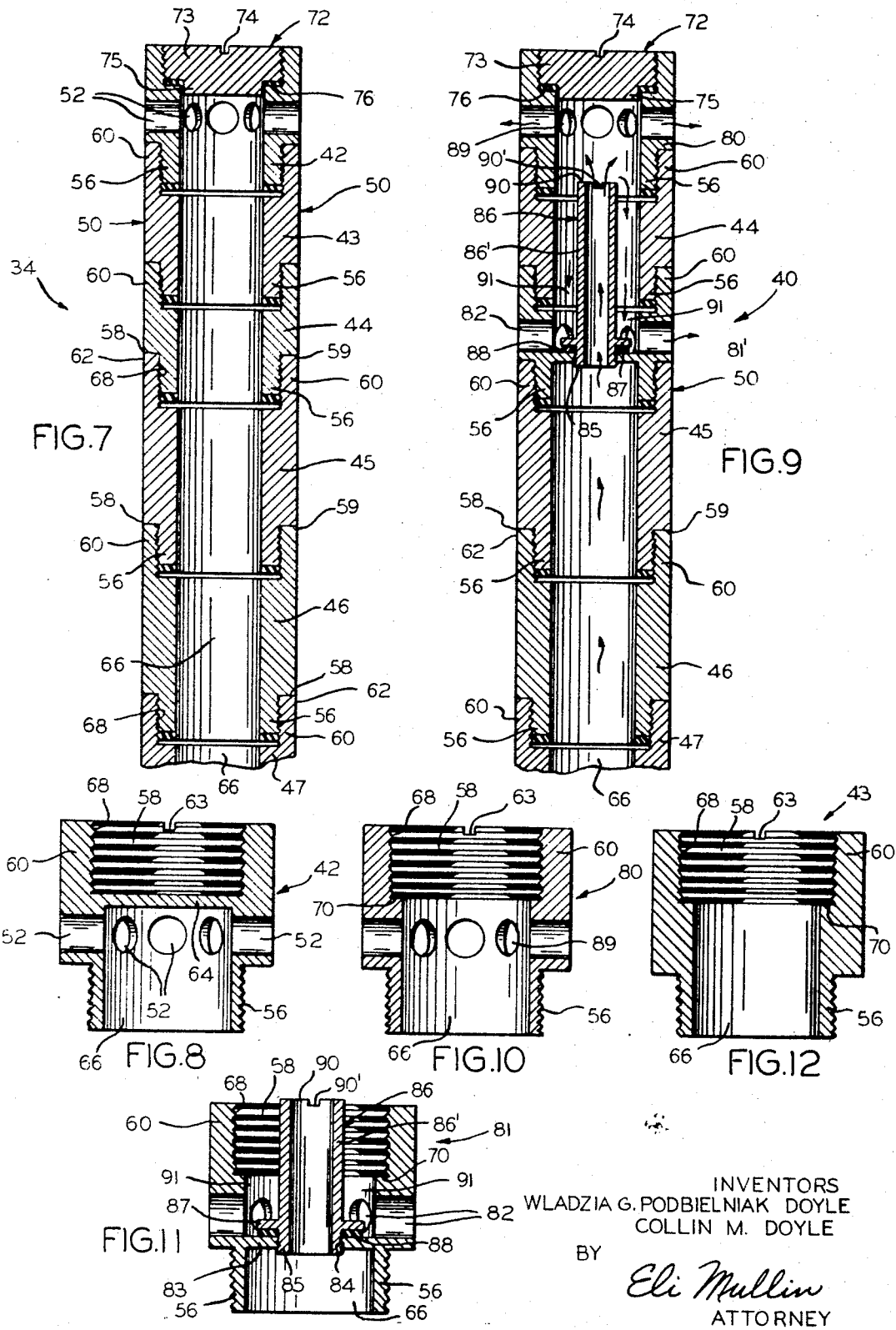

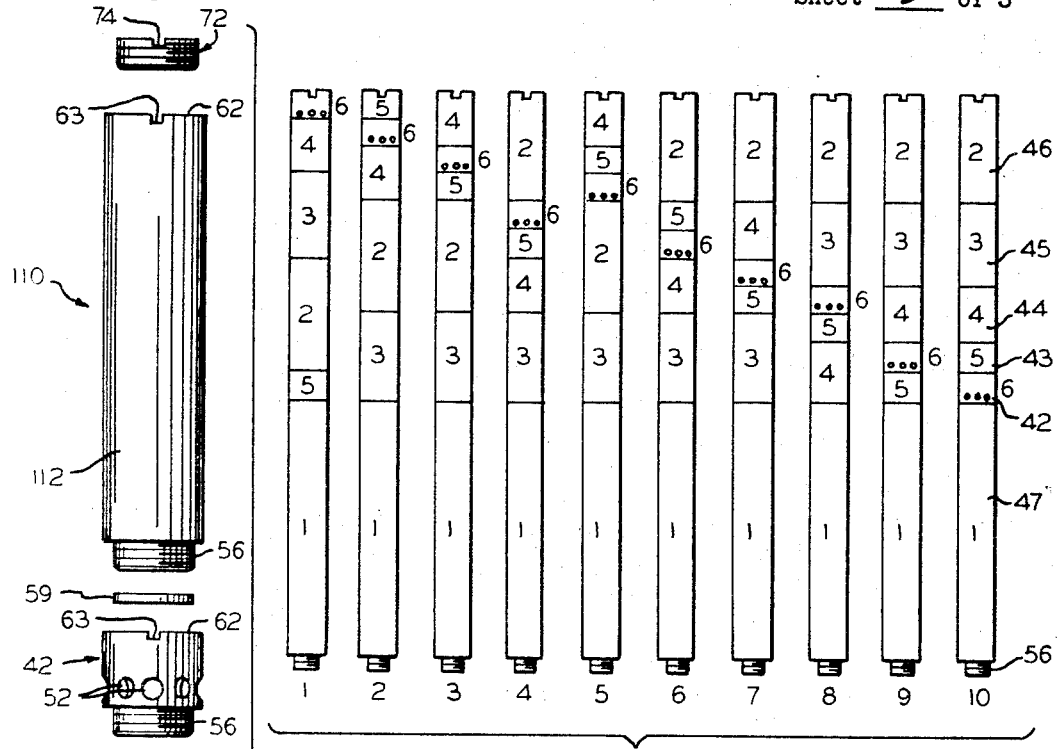
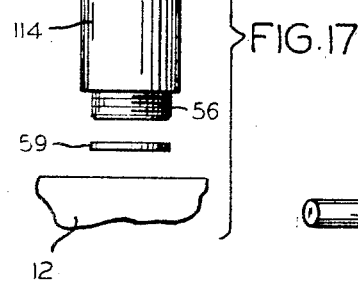
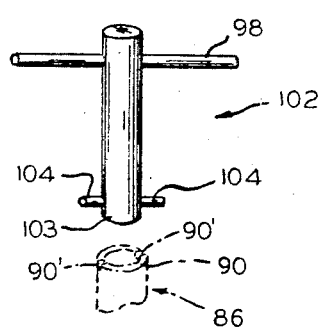
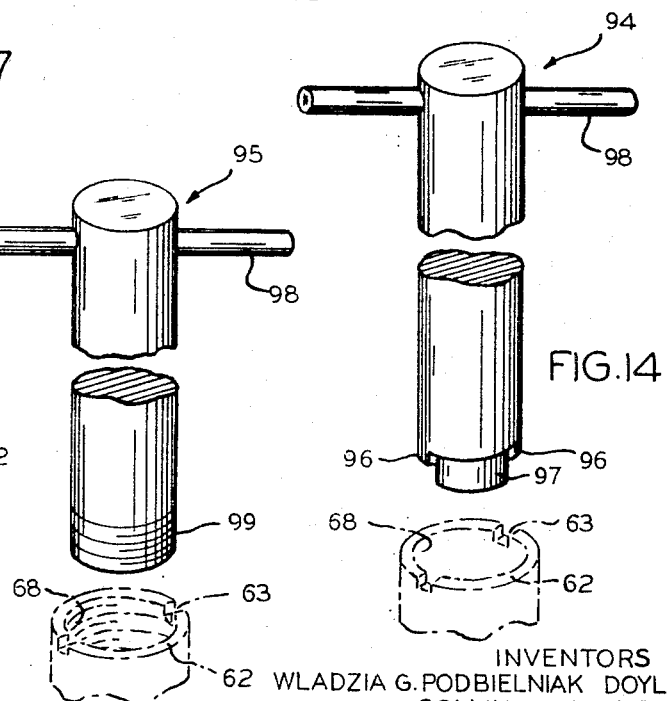

3,445,060
ARTICULATED LIQUID FEED OR DISCHARGE COLUMN FOR COUNTERCURRENT EXCHANGE DEVICES
Wladzia G. Podbielniak Doyle and Collin M. Doyle, both of 21 W. Elm, Chicago, Ill. 60610
Filed Aug. 11, 1966, Ser. No. 571,752
Int. Cl. B04b 5/06
U.S. Cl. 233—15                                  6 Claims

ABSTRACT OF THE DISCLOSURE

An articulated liquid feed or discharge column for countercurrent exchange devices has a plurality of tubular segments removably secured in interchangeable end-to-end relationship to form a column. At least one of the segments comprises either a selector conduit or a stopper selector with one or more openings formed in the wall thereof. An imperforate tubular or conduit member used with two selector conduits in said articulated column affords a dual phase liquid feed means.

Background of the invention

This invention relates generally to improvements in liquid feed or discharge means for countercurrent exchange devices of the type disclosed in the copending patent application of one of the applicants, application Ser. No. 544,971 filed Apr. 25, 1966, and entitled "Combination Phase Separator and Adjustable Liquid Inlet and Discharge Means for Centrifugal Countercurrent Exchange Devices," now issued as Patent No. 3,292,850. More particularly, the invention pertains to an articulated liquid feed or discharge column whereby the level of liquid input to, or discharge from, said devices may be readily varied.

The adjustable liquid feed and discharge means of the aforementioned co-pending application comprised a liquid distribution tube extending from the central rotor shaft to the periphery of the rotor of the centrifugal countercurrent exchange device. The tube was formed with a plurality of sets of longitudinally spaced openings, the openings of each set being spaced circumferentially around the tube. A plurality of sleeves were removably positioned in end-to-end relationship within the tube. One of the sleeves was provided with one or more selector openings circumferentially spaced therearound and was designated a selector sleeve. The other sleeves were imperforate. As a result of the geometric relationship between the imperforate sleeves, the selector sleeve and the tube, the sleeves could be arranged so that the selector sleeve was positioned with its respective selector openings in registry or aligned with one of the sets of openings of the tube. When so positioned said aligned openings became the inlet or outlet for the liquids. By varying the position of the selector sleeve, the liquid inlet level into the rotor or the discharge level from the rotor could be readily varied.

The present invention eliminates the sleeves so that the tube or articulated column alone serves as the inlet or outlet for the liquids. This inlet or outlet can be readily varied by rearranging the segments comprising the articulated column.

In accordance with one embodiment of the invention, a plurality of column segments are removably secured in an end-to-end relationship to form an articulated liquid flow column of a predetermined length. At least one of the segments or conduit elements comprises a selector conduit with one or more openings formed therein. The other conduits are hollow and imperforate. The conduits are arrangeable so that the selector conduit may be selectively positioned at any point throughout the length of the articulated column thereby providing the desired level for introducing a liquid into, or removing a liquid from, the mixing chambers of the rotor. The conduits include suitable attaching means which permit the same to be readily rearranged and secured together to form the articulated column.

A stopper selector having a partition wall positioned between the ends thereof and identical attaching means as the conduits may be substituted for the selector sleeve. The partition wall or closed end of the selector prevents the flow of liquid through the articulated column outward of the point in the column where it is positioned. Thus in a countercurrent liquid exchange device having two liquid feed means the stopper selector may be positioned in one of said means to prevent the flow of liquid into the device. This converts the countercurrent exchange device from a liquid extractor to a liquid phase separator for a single liquid mixture containing two or more phases.

Another embodiment of the invention comprises a dual phase liquid feed means wherein a plurality of conduits are removably secured together in end-to-end relationship to form an articulated liquid flow column of a predetermined length. In this embodiment, two of the conduits are of the selector type each formed with circumferentially spaced selector openings therein. The conduits or segments are arrangeable so that the selector conduits are positioned in spaced-apart relationship within the articulated column. An imperforate tubular or conduit member of the type disclosed in the copending patent application entitled "Adjustable Dual Phase Liquid Feed Means for Centrifugal Countercurrent Exchange Devices," Ser. No. 552,753 filed May 25, 1966, is positioned to extend outward through the innermost selector conduit with the upper end thereof positioned just below the selector openings of the outer selector conduit. This embodiment may be used where it is desired to introduce a third liquid simultaneously into the countercurrent exchange device in admixture with one of the other liquids as disclosed in the aforementioned copending patent application.

It is a primary object of this invention to provide an adjustable liquid feed or discharge means in which the liquid distribution tube is entirely eliminated. By eliminating the liquid distribution tube, it is no longer necessary to precisely and accurately dimension and position the openings in the distrbution tube with those of the selector sleeves since the only openings necessary are formed in the selector segment or conduit. Similarly, loss of system efficiency due to misalignment of openings is eliminated.

It is another primary feature of this invention to provide a dual-phase liquid feed means comprising a plurality of conduits removably connected together to form an articulated column with two of the conduits being selector conduit elements. The selector conduits may be readily varied throughout the articulated column to selectively provide inlets into a mixing chamber for both a light phase liquid and a heavier phase liquid.

It is still another object of this invention to provide a liquid stopper selector which may be readily removably connected between any two conduit elements of the aforementioned articulated column, to block the flow of liquid through said column.

With the foregoing and other objects in view which will appear as the description proceeds, the invention consists of certain novel features of construction, arrangement, and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a fragmentary sectional view of centrifugal countercurrent exchange device incorporating therein the adjustable single phase liquid feed means, adjustable single phase discharge means and the dual phase liquid feed means, each of which embody the principles of this invention;

FIG. 2 is an exploded fragmentary view in perspective of the component parts of a six conduit adjustable liquid feed column;

FIG. 3 is an exploded perspective view of a dual-phase liquid feed means assembly;

FIG. 4 is a perspective view of the elongated conduit element, a fragment of which is shown in FIG. 2;

FIG. 5 is a section view of the column stopper element;

FIG. 6 is an enlarged top view taken on the plane of the line 6—6 in FIG. 4, and viewed in the direction indicated;

FIG. 7 is a fragmentary sectional view of the assembled combination comprising the single phase liquid feed means;

FIG. 8 is an enlarged sectional view of the selector conduit element shown in FIGS. 2 and 7;

FIG. 9 is a sectional view of the assembled combination comprising the dual-phase liquid feed means;

FIG. 10 is a sectional view of the heavy phase selector conduit of the dual phase liquid feed means;

FIG. 11 is a sectional view of the light phase selector conduit of the dual-phase liquid feed means showing the mixture conducting tubular member operatively positioned therein;

FIG. 12 is an enlarged sectional view of a supporting conduit element;

FIG. 13 is a diagrammatic sketch illustrating ten of the nineteen available positions for the six conduit element liquid feed means shown in FIG. 7;

FIG. 14 is a perspective view of the tool for disconnecting one conduit element from another conduit element;

FIG. 15 is a perspective view of the tool used to connect one conduit to another and to remove the individual conduits from the other conduits;

FIG. 16 is a perspective view of the tool for loosening the mixture conducting tubular member from the light phase selector of the dual phase liquid feed means; and FIG. 17 is a perspective exploded view of a three conduit adjustable feed or discharge means.

Referring more particularly to FIG. 1 of the drawings, the reference numeral 10 indicates generally a centrifugal countercurrent exchange device in which is incorporated the various combination liquid feed and discharge means, including the dual-phase liquid feed means, embodying the principles of this invention. Since the basic device 10 is generally of the type described in the aforementioned copending applications, only so much thereof as is necessary for an understanding of the present invention will be described in detail. The device 10 thus comprises an axial shaft 12 journalled for rotation in a suitable supporting structure. A drum or rotor 14 is rigidly connected to the shaft 12 for rotation therewith.

Suitable passageways such as 16 and 18 are provided in the shaft 12 for respectively supplying the heavier principal liquid and removing the light separated liquids. Similarly, suitable passageways such as 20 and 22 are provided for respectively supplying the light principal liquid under pressure and removing the heavier separated liquids. When necessary in certain processes an auxiliary or third-phase liquid, may be admixed with either the light or heavier principal liquids prior to its introduction into the rotor.

The rotor 14 comprises a cylindrical outer wall 24 and a pair of end plates 26, 26. Mounted between end plates 26 is a plurality of spaced apart separator walls or bands 28 which may be arranged, for example, either concentrically or as a continuous spiral, as is well known in the art. Each pair of adjacent bands 28 define a liquid contacting chamber 28′. The bands 28 may be formed with a plurality of perforations 29 therethrough or with disc columns (not shown) having perforated discs therein.

The bands 28 also include large openings which are aligned and arranged to afford a plurality of radially extending cavities 30. These radially extending cavities are designed to accommodate adjustable liquid feed means 34 (FIGS. 1, 2 and 7), adjustable discharge means 36 (FIG. 1), or dual-phase liquid feed means 40 (FIGS. 1 and 9).

The adjustable liquid feed means 34 and the adjustable liquid discharge means 36 are identical in structure. Each comprises a selector conduit 42 and a plurality of support conduits 43, 44, 45, 46 and 47 (see FIGS. 2 and 7) removably secured together in an end-to-end relationship to form a predetermined length of a fluid-conducting, articulated column, indicated generally by reference numeral 50 (FIG. 7). All of the conduits save the selector conduit 42 are imperforate. The number of conduits and the comparative lengths of the same are determined by the range of selectivity desired for varying the level of input or the level of liquid removal from the rotor of the centrifugal countercurrent exchange device 10.

Thus, in accordance with the geometric principles upon which this invention is based, the six conduits of the main illustrative embodiment are arrangeable together to provide nineteen different liquid input levels throughout the length of articulated column 50. FIG. 13 illustrates ten different positions of levels for the selector conduit 42 and nine additional positions (not shown) are obtainable by merely rearranging the conduits in a similar manner but with the elongated conduit 47 forming the uppermost end of the articulated column 50.

FIGS. 2 and 7, having the selector conduit 42 at the uppermost end of column 50, illustrate the adjustable liquid feed means 34 for a light phase principal liquid. In FIG. 1, the selector conduit 42 is nearer the central area of the rotor 14, and hence illustrates the adjustable liquid feed 34 for a heavy phase principal liquid.

As shown in FIGS. 2 and 7, five of the six conduits forming column 50 of the adjustable liquid feed means 34 are imperforate. Only selector conduit 42 is provided with a group of circumferentially spaced openings 52. Thus, as shown in FIG. 13, selector conduit 42 cooperating with the imperforate support conduits 43, 44, 45, 46 and 47 provides a nineteen position level selector.

Referring to FIG. 2, each conduit 42, 43, 44, 45, 46 and 47 is formed with an externally threaded neck 56 formed at one end of the conduit. Neck 56 is recessed inward from the outer surface of the conduit to afford a shoulder 58, the purpose of which will become apparent as the description proceeds. A suitable gasket 59 is positioned around neck 56 and in abutment with shoulder 58 (FIGS. 2 and 7).

The opposite end of each of the conduits includes an internally threaded collar 60 dimensioned to threadedly engage the neck 56 of any of the other conduits. Thus, referring to FIG. 7 it will be seen that when one conduit is secured to another, shoulder 58 abuts the outer edge 62 of the adjacent collar 60 of an adjoining conduit, except that the gasket 59 is interposed therebetween.

Recessed inwardly from the outer edge 62 of collar 60 of each of the conduits are a pair of opposed tool accommodating notches 63. Notches 63 provide means for loosening one conduit from the other, as will be further disclosed subsequently in connection with the description of the tools shown in FIGS. 14 and 15.

As shown in FIG. 8, the selector conduit 42 includes a closure wall 64 positioned between collar 60 and the selector openings 52. The closure wall 64 prevents the flow of liquid beyond the selector openings 52 in the direction toward the periphery of rotor 14. Selector conduit 42 is the liquid level selector or diffuser for either the light or heavy liquid according to the column in which it is positioned. Each conduit includes a cylindrical bore 66, which extends from the outer end of the neck to an area adjacent the collar (see FIGS. 2, 6 and 7), and a cavity 68 defined by the inner surface of collar 60. Within each of the support conduits 43, 44, 45, 46 and 47 bore 66 communicates with the collar cavity 68. However as particularly shown in FIG. 8, closure wall 64 of selector conduit 42 prevents the communication between bore 66 and collar cavity 68.

The collar cavity 68 of each conduit has a greater diameter than that of bore 66. Inside each of the support conduits 43, 44, 45, 46 and 47, a shoulder 70 (see FIGS. 6 and 7) is formed as shown. The width of shoulder 70 is preferably substantially equivalent to the thickness of the wall of the neck 56. Thus, when the neck of one conduit is inserted inside the collar cavity 68 of another conduit and the other conduits are similarly connected, the inside surface of each element of the articulated column 50 is substantially aligned, thus affording a smooth walled passageway therein having substantially the diameter of bore 66. The length of the passageway functioning as a liquid flow path, of course, depends upon the positioning of the selector conduit 42.

Completing the assembly of the adjustable liquid feed means 34, a sealing plug 72 (FIGS. 2 and 7) is inserted within the outermost conduit of articulated column 50. Preferably plug 72 comprises an externally threaded head portion 73 having a tool engaging slot 74 formed in the end thereof. Integrally formed at the bottom of head 73 is a reduced-diameter portion 75 which affords an annular shoulder 76 therebetween. A suitable gasket 76' is positioned on portion 75 and in abutment with shoulder 76.

The neck 56 of the lowermost conduit may be screwed into a suitable internally threaded hole 77 (FIG. 1) formed in the rotor shaft 12 to thereby position the column 50 operationally within the device 10. The entire assembly of the liquid feed means 34, as shown in FIG. 7, is locked together in a liquid tight relationship, save for the selector openings 52 which provide the inlets for the liquids into the rotor from the articulated column 50 for the liquid received from a communicating passageway with the lowermost conduit.

When it is desired to prevent liquid from flowing through the articulated column 50, a column stopper 78 (as shown in FIG. 5) is inserted therein. Column stopper 78 also includes an internally threaded collar 60 and an externally threaded neck 56. An inner wall 79 is disposed between the collar and the neck thereof. Thus, when the column stopper 78 is in position, inner wall 79 blocks liquid flow through the conduit. Hence, when the stopper selector is placed in one of two liquid feed columns 50, the back flow through that column is prevented from occuring, thereby permitting the system to effectively function as a phase separator for a single liquid.

Hence, a single exchange device may operate either as a liquid extractor or as a phase separator for a single liquid mixture containing two phases.

Turning now to FIGS. 1, 9, 10 and 11, it will be seen that the articulated column 50 is also suitable for providing a dual-phase adjustable liquid feed means 40. The dual phase liquid feed means 40 comprises a heavy phase selector conduit 80 (FIG. 10) and a light phase selector conduit 81 (FIG. 11). Conduit 81 is positioned closer to the shaft 12 than the heavy phase selector conduit 80. Utilizing the same geometric principles as in the adjustable single-phase liquid feed and discharge means 34, 36, the heavy and light phase selector conduits 80 and 81 are formed in the same lengths as selector conduit 42 and support conduit 43. The other support conduits in the dual-phase feed means 40 may be identical respectively to the solid-walled, imperforate support conduits 44, 45, 46 and 47.

As shown in FIG. 11, a plurality of selector openings 82 is formed within the light phase selector conduit 81, between collar 60 and neck 56. A partition wall 83 separates the portion of the selector conduit 80 inside the neck 56 below selector openings 82 from the remaining inside portion of the conduit. Partition wall 83 includes a centrally positioned threaded aperture 84, dimensioned to engage the externally threaded bottom end 85 of a tubular member 86 (see FIGS. 3, 9 and 11).

Tubular member 86 comprises an elongated main body portion 86' which extends upward from an annular collar 87 (FIGS. 3, 9 and 11). Collar 87 is positioned slightly above the threaded bottom end 85 of the tubular member to receive a gasket 88 within the space therebetween. Thus, when the threaded bottom end 85 is screwed into aperture 84 of partition wall 83, the gasket 88 is sandwiched between collar 87 and the upper surface of the partition wall 83.

The heavy-phase selector conduit 80 includes a plurality of circumferentially spaced selector openings 89 (FIGS. 9 and 10). Note, that the heavy-phase selector conduit 80 differs from selector conduit 42 of the adjustable liquid feed means 34 by not having a closure wall such as 64 (compare FIGS. 8 and 10). Hence, the fluids flowing within the heavy phase selector conduit 80 may flow beyond collar 60 thereof. Thus, except when the heavy phase selector conduit serves as the uppermost conduit of column 50, a greater separation zone is available for optimum light and heavy liquid separation prior to admission thereof into the rotor from column 50.

In the dual-phase selector the outermost end 90 of the tubular member 86 extends to a predetermined level within the articulated conduit 50 adjacent the separation zones for a liquid mixture through the tubular member 86. The purpose thereof will be disclosed as the description proceeds.

As shown in FIGS. 3, 9 and 11 a pair of opposed tool accommodating recesses 90' are formed at the outer end 90 to permit tubular member 86 to be easily and conveniently disconnected from the light phase selector conduit 81.

The outer surface of the main body portion 86' of tubular member 86 and the spaced apart opposed inner surface of the light phase selector conduit 81 define an annular channel 91 therebetween. Channel 91 provides a passageway for the light phase liquid after the same has separated from the heavy phase liquid prior to its emission into the rotor via selector openings 82. As shown in FIG. 1, an externally-threaded access plug 92 is threadedly associated with a suitably internally-threaded access hole 93 within the outer wall 24 of rotor 14. Thus, removal of plug 92 provides access to the adjustable liquid feed and discharge means 34, 36 or to the dual-phase feed means 40 as the case may be.

To removably secure the conduits in their end-to-end operative relationship and to readily remove the same from the rotor 14, a loosening tool 94 (FIG. 14) and a combination tightening and removing tool 95 (FIG. 15) are provided. To remove the conduits from their operative assembled arrangement as shown in FIGS. 1, 7 and 9, the access plug 92 and the closure plug 72 are first removed. The loosening tool 94 is then inserted into the rotor via access hole 93 until are ears 96 of the tools are seated within notches 63 and the pilot 97 is extended within cavity 68 of the upper conduit. Thus, upon turning handle bar 98 of tool 94 the uppermost conduit is loosened from its connection with the adjoining conduits.

To remove the loosened conduit, tool 94 is replaced by tool 95 and the threaded bottom end 99 thereof is screwed into the loosened conduit by means of handle bar 98. The neck 56 of the loosened conduit is completely disassociated from the adjoining conduit by rotating the tool via handle bar 98 in the opposite direction and lifting tool 95 and the connected upper-most conduit out from the rotor 14.

To securely connect the conduits operatively to form column 50, the collar 58 of the individual conduits is screwed on the threaded bottom end 99 of tool 95 and inserted into the rotor. The neck 56 of this conduit is threadedly attached to another conduit, or within the hole 77 in the shaft 12 if it is the lowermost conduit of the articulated column 50. Then tool 95 is unscrewed from the collar of the conduit.

To remove the tubular member 86 from its threaded attachment with the light phase selector conduit 81, a small, loosening tool 102, similar to tool 94 is provided. Pilot end 103 extends inside tubular member 86 and prongs 104 are positioned inside the recesses 90'.

The complete adjustability of the liquid feed and discharge means 34 and 36 of the dual-phase liquid feed means 40 may now be appreciated by referring to the various figures of the drawing, particularly FIG. 13. For convenience of illustration in FIG. 13, only the conduits are numbered 1 (one) through 6 (six). Conduits 1 through 5 correspond to the support conduits 43, 44, 45, 46 and 47, whereas conduit 6 correspond to the selector conduit 42. Conduit 1 is an elongated conduit; conduits 2 and 3 are identical but shorter than conduit 1; conduit 4 is shorter than conduits 1, 2 and 3; conduit 5 is shorter than the other support conduits; and conduit 6 is the liquid level selector conduit and is of substantially the same length as conduit 5.

FIG. 13 as aforestated, illustrates ten (10) positions of nineteen (19) available input or discharge positions for a six conduit liquid feed or discharge means 34, 36 of an illustrative embodiment of the invention.

The other nine positions for the selector conduit 6 (not shown) are provided by positioning the elongated conduit 1 at the upper end of the articulated column instead of the lower end, and the other conduits may be placed therebelow in a similar arrangement as shown in positions 1 to 9. Due to the comparative lengths of the conduits, the level for the selector conduit 6 shown in FIG. 10 is obtainable with the elongated conduit, either at the upper or lower end.

The adjustability of the positioning of the components, as illustrated in FIG. 13 provide a wide range of level of light liquid input into the rotor 14. Thus, the elongated component 47 need rarely be removed from the device 10 when adjusting light liquid level input.

In practice it has been found that by positioning the elongated conduit 47 outermost in the column 50, a minimum number of elements need be repositioned to achieve maximum variation of the heavy phase liquid feed means.

For many applications, complete adjustability throughout the radial length of the rotor is unnecessary. Thus, as an alternative embodiment, a three conduit articulated column 110 is illustrated in FIG. 17. An elongated conduit 112 and a shorter conduit 114 cooperate with the selector conduit 42 to provide four levels for the selector conduit. Thus, two positions or input levels are provided if the articulated column 110 is used as a heavy phase liquid feed means, and two positions are provided if the articulated column is used as a light phase liquid feed means.

Since for discharge purpose the variable discharge means is used primarily for removal of the heavy phase separated liquid only, the articulated column 110 affords essentially two levels for heavy phase liquid removal. The light liquid is of course removed directly at and through the shaft.

When the articulated conduit 50 for a liquid feed or discharge means is used, the entire construction of the centrifugal devices is greatly simplified since it obviates or eliminates heretofore necessary spill-over discs or similar internal rotor passageways which were utilized to perform this function. It should also be appreciated that by virtue of the novel cooperating structure of the support conduits 43, 44, 45, 46 and 47 with the selector conduit 42, the efficiency of the exchange function is improved, since the level selector of the invention herein does not require alignment with apertures of an external liquid distribution tube. Moreover, closure wall 64 of selector conduit 42 (FIG. 8), for any position other than the outermost, assures that all of the liquid flows out of the selector openings 52 at the pre-selected position without requiring the entire articulated column 50 to be filled with the liquid before the same begins to flow out of the openings of the selector conduit. For example, if the articulated column 50 is used as a liquid feed means and is positioned adjacent the shaft (position 1 or 2 are seen in FIG. 13) the liquid pressure head would force the liquid to fill the entire column 50 before the liquid would begin to flow out of the selector opening 58, were it not for the selector conduit closure wall 64 preventing such flow.

When it is desired to convert the exchange device to a phase separator, the closed-end column stopper 78 is positioned within one of the liquid feed articulated conduits 50, to prevent any back feeding through the articulated column.

Thus, when either of the liquid inlet passages 16 or 20 is blocked or shut off at the pump, external to the device, so that only one liquid is fed into the device, the backflow through the unused feed means is blocked by the column stopper 78. The centrifugal action of the device 10, of course, then separates the single liquid into two or more phases with the light phase flowing out through the light liquid discharge passage 18 and the heavier phase being discharged through the heavier liquid discharge passage 22. The inlet and discharge points for both the light and heavier phases may be adjusted in the same manner as described hereinabove, by merely properly positioning the level selector conduit 42 within the length of articulated column 50. Thus, if the selector conduit 42 is positioned near the periphery of the rotor, as for example, in one of the positions 1, 2 or 3 illustrated in FIG. 13 and placed to function as a liquid discharge selector conduit, the heavier phase liquid is discharged from the interior of the rotor through the selected peripheral discharge openings, thereby entering the articulated column 50 near the periphery and then being conducted through the discharge means 36 to the heavier liquid discharge passage 22.

Turning now particularly to FIGS. 1 and 9, the operation of the dual phase liquid feed means 38 will be described. Referring to FIG. 1, a light principal liquid is admixed with a heavier auxiliary liquid in the desired proportion at a pump located on the outside of the exchange device 10. The mixture, which may be in the form of a dispersion, is caused to flow through passageway 20 within shaft 12 and into the adjustable dual phase liquid feed means 40. The entire mixture which enters feed means 40 flows through the mixture conducting tubular member 86 toward the periphery of the rotor. Since the centrifugal force separates the mixture within the feed means 40 in exactly the same manner as if the mixture were within the rotor, the light principal liquid and the heavier auxiliary liquid separate from the mixture. The heavier liquid flows outward toward the rotor periphery, whereas the light liquid flows inward toward the shaft 12. The separated heavier auxiliary liquid is emitted from the dual phase liquid feed means 40 via the selector openings 89 of the outer or heavy phase selector conduit 80. The separated light principal liquid flows within annular channel 91 toward the inner or light phase selector conduit 81 to be emitted into the rotor via selector openings 82. It should be particularly noted that the collar 88 and the outside wall of the tubular portion 86' of the tubular member 86 isolate the light principal liquid from the admixed liquids flowing through tubular member 86. This enables dual phase feed means 40 to function efficiently as a separating chamber.

The length of the tubular portion 86' of the tubular member 86 may be varied to optimize the efficiency of the separation of the liquids from the mixture flowing within the dual phase liquid feed means 40 and to control the size of the separation zone of the liquids. Hence, if the spaced apart distance between the selector conduits 80, 81 is increased or decreased from that shown in FIG. 3, the length of the tubular portion 73 is correspondingly varied so that the outer end thereof is positioned adjacent the new zones of liquid separation within dual phase feed means 40. Therefore, by designing the removable tubular member 86 to cooperate with the removable conduits, the zones of liquid separation are optimized by replacing conduit 86 with another having either a longer or shorter tubular portion 86', as determined by the properties of the fluids or liquids being separated from the mixture flow through tubular member 86.

It has been found that for the efficient dispersion of the liquid phase into the rotor interior via the selector conduit 42, the circumferentially spaced selector opening 52 should be preferably eight in number, equally spaced, and of ellipsoidal configuration.

While the foregoing discussion has been directed to a liquid feed or discharge means and a dual-phase liquid feed means for a centrifugal countercurrent exchange device, it will be obvious to those skilled in the art that both the single-phase liquid feed or discharge means and the dual-phase liquid feed means may also be applicable in systems other than centrifugal counter-current exchange devices. For example, this may be used in devices such as static columns or even mechanical operating devices including rotating disc columns, "Schiable" columns and "Rushton" columns.

Moreover, although FIG. 1 illustrates discharge means 36 for a heavy principal phase liquid, an additional discharge means of the type disclosed herein, may be positioned in the rotor 14 for feeding off the interfacial accumulations which may develop between a light principal phase and a heavy principal phase during, for example, a liquid extraction proces. Thus, for an interface discharge means, the selector conduit 42 of the articulated conduit 50 is positionable at a level between the light and heavy phase. However, to precisely set the selector conduit within the area of the interface, it may be necessary to adjust the position or level of the interface by varying the light phase liquid back pressure or the quantity of heavy phase liquid inside the mixing chamber.

Note in FIG. 1 that the upper end of the articulated conduit is spaced from the access plug 92. This prevents any undue pressure from being applied against access plug 92. Moreover, the pacing also permits the column stopper 78 to be inserted within the column when necessary.

From the foregoing description and drawings, it should be apparent that a novel combination adjustable single-phase liquid feed or discharge means and dual-phase liquid feed means, has been provided in which is eliminated the heretofore necessary liquid distribution tube. The adjustable liquid feed means and discharge means is particularly suitable for counter current exchange devices and render such devices universally adaptable for all liquid extraction processes, as well as phase separation processes. The geometric relationship of a minimal number of imperforate supporting conduits cooperating with selector conduit 42 to form a length of a fluid flow articulated column 50, permits the liquid output from the column and/or the input therein to be adjusted as required over the entire length of column 50.

Moreover, the conduit elements may be removably secured together in an end-to-end relationship, thereby enabling the level of the selector conduit to be varied without requiring the alignment of the selector openings of the conduit with external openings such as, for example, in the prior liquid distribution tubes.

A stopper selector having the same attaching means as the conduits of the articulated column 50, enables a centrifugal counter current exchange device to be used for phase separation as well as liquid extraction.

Furthermore, the geometric relationship between a minimal number of conduits including a pair of selector conduits, which are removably connectable together to form an articulated column 50, permits both of the selector conduits to be adjusted. Thus, the level of output of both light phase fluid and heavy phase fluid may be varied. The articulated column thus functions as a dual phase fluid feed means.

The tubular member removably positioned inside the dual-phase liquid feed articulated column substantially isolates the mixture of the light and heavy phase fluids from the separated liquid phases, particularly the light fluid phase. Furthermore, the complete interchangeability of the conduits elements and the cooperation of the tubular member with the conduits, permit the level of fluid output into the interior, for example, of a centrifugal counter current exchange device to be varied and the length of the tubular member and/or the position of the same within the articulated column to be varied. Thus, control over both the separation zones within the interior of the rotor and within the articulated column is thereby provided.

What we claim and desire to secure by Letters Patent of the United States is:

1. In variable liquid feed and discharge means for conducting liquids therethrough in centrifugal countercurrent exchange devices of the character described, the herein invention comprising:

a plurality of conduits having means for securing the conduits together but in disjoinable liquid tight end-to-end relationship to form an articulated self-sustaining liquid conducting column, at least one of said conduits being a selector conduit having at least one selector opening formed in the wall thereof, said conduits having means capable of being rearranged to vary the position of said selector conduit in any position in said column, whereby the point of admission of liquid into or discharge from said device is varied.

2. The variable means of claim 1 wherein said second-mentioned means comprises a reduced-diameter externally threaded neck formed at one end of each of said conduits and an internally threaded portion in the other end of said conduit.

3. The variable means of claim 2 in which one of the conduits which may be inserted into said column has a closure wall positioned between said externally threaded neck and said internally threaded portion.

4. The variable means of claim 2 in which all save said selector conduits have substantially imperforate walls and at least some of said imperforate conduits are of varying length and multiples of other such lengths.

5. The variable means of claim 2 in which said selector conduits are two in number and positioned in spaced relationship one with the other within said column, a tubular member having inner and outer ends positioned within said column and extending between said selector conduits, means blocking the annular passage surrounding said tubular member, the outer diameter of at least a portion of said tubular member being less than the inner diameter of said column whereby an annular passage is afforded between the tubular member and the column, whereby said liquid flows out through said tubular member so that a component of the liquid flows into said exchange device through the selector openings of the selector conduit adjacent the outer end of said tubular member, and the remainder of the liquid flows back through said annular passage and out through the selector openings in the selector conduit adjacent the inner end of the tubular member.

6. The variable means of claim 2 in which said tubular member is of variable length.

References Cited

UNITED STATES PATENTS

| | | | |
|---|---|---|---|
| 658,313 | 9/1900 | Bernardi | 285—12 X |
| 1,613,461 | 1/1927 | Johnson | 138—155 X |
| 3,050,238 | 8/1962 | Doyle et al. | 233—15 |
| 3,107,218 | 10/1963 | Doyle | 233—15 |
| 3,221,985 | 12/1965 | Burdett | 233—15 |
| 3,292,850 | 12/1966 | Doyle | 233—15 |

HENRY T. KLINKSIEK, *Primary Examiner.*